(12) United States Patent
Kameyama

(10) Patent No.: US 7,146,097 B2
(45) Date of Patent: Dec. 5, 2006

(54) FOCUSING DEVICE

(75) Inventor: Yasuaki Kameyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 183 days.

(21) Appl. No.: 10/930,243

(22) Filed: Aug. 30, 2004

(65) Prior Publication Data

US 2005/0063695 A1    Mar. 24, 2005

(30) Foreign Application Priority Data

Sep. 22, 2003  (JP)  ............... 2003-330118
Sep. 22, 2003  (JP)  ............... 2003-330129
Sep. 22, 2003  (JP)  ............... 2003-330134

(51) Int. Cl.
*G03B 3/10*     (2006.01)
*G03B 13/34*    (2006.01)
*G02B 7/04*     (2006.01)

(52) U.S. Cl. .................. 396/133; 396/144; 359/824

(58) Field of Classification Search ............ 396/133, 396/144; 359/699–701, 824, 822, 823; 348/340, 348/345, 357

See application file for complete search history.

(56) References Cited

U.S. PATENT DOCUMENTS 4,605,286 A * 8/1986 Sumi ................... 359/696
6,650,832 B1 * 11/2003 Masuda ................. 396/83
2003/0178911 A1  9/2003 Aoshima ............... 310/266

* cited by examiner

*Primary Examiner*—W. B. Perkey
(74) *Attorney, Agent, or Firm*—Beyer, Weaver & Thomas LLP.

(57) ABSTRACT

There is provided a focusing device capable of rapidly moving a lens to a minute focusing region and of realizing minute movement of focusing the lens in the minute focusing region. A lens moving mechanism comprises a first guide portion for guiding a lens to move in an optical-axis direction by a first predetermined distance to a minute focusing region and a second guide portion for guiding the lens 5 to minutely move in an optical direction by a second predetermined distance in the minute focusing region. The first guide portion is comprised of inclined portions $8a12$ and $8a22$ of guide grooves $8a1$ and $8a2$ of the outer cam 8. The second guide portion is comprised a first cam $4a1$ and a second cam $4a2$ of a lens holder 4.

15 Claims, 18 Drawing Sheets

FOCUSING DEVICE

BACKGROUND OF THE INVENTION

1. Field of the Invention

The present invention relates to a focusing device for moving a lens of a small camera by driving a motor to control a focus.

2. Description of the Related Art

Such a kind of conventional technology is disclosed in the Patent Document 1. In the technology disclosed in Patent Document 1 (see Japanese Unexamined Patent Application Publication No. 2002-51524 (Paragraph Numbers 0058 and 0059 and FIG. 7) and corresponding U.S. Unexamined Patent Application Publication No. 2003/0178911A1), a pin is formed in a magnet that forms a rotor of a hollow motor and engages the above-described pin with a lens holder that holds a lens. The lens holder and a main body are connected to each other in a screw-shaped guide groove.

According to the conventional technology, when the rotor, that is, a magnet is rotated by driving the hollow motor, the lens holder rotates through the pin of the magnet. That is, the lens held in the lens holder proceeds so as to protrude from the main body or recedes so as to be received in the main body. Thus, the lens moves in an optical-axis direction to control the focus.

It has been desired to rapidly move the lens from a predetermined stand-by position, for example, an accommodating position of the main body to a minute focusing region and to minutely move the lens in the direction of the optical direction in the minute focusing region.

However, according to the above-described conventional technology, since the lens holder that holds the lens moves while rotating along the screw-shaped guide groove, it take long time for the lens to move from the reception position to the minute focusing region. Thus, it is not possible to satisfy the above-described desire.

Also, when the pitch of the guide groove is set to be large in the conventional technology, it is possible to secure a large amount of movement of the lens holder with respect to the number of rotations of the lens holder, that is, a large amount of movement of the lens such that it is possible to rapidly move the lens from the reception position to the minute focusing region. However, when the pitch of the guide groove is set to be large, it is not possible to realize minute motion such as focusing the lens in the minute focusing region, that is, to perform minute control. Thus, such a structure cannot be mentioned as practical.

When it is considered that the lens rapidly moves through a cam groove, a member for forming the cam groove is necessary in addition to a protrusion engaged with the cam groove such that the entire structure becomes complicated to increase the manufacturing cost.

SUMMARY OF THE INVENTION

Accordingly, the present invention is designed to solve the above problems. It is an object of the present invention to provide a focusing device capable of rapidly moving a lens to a minute focusing region and of realizing minute motion such as focusing the lens in the minute focusing region.

It is another object of the present invention to provide a focusing device capable of moving a lens to a minute focusing region by a simple structure.

According to the present invention, it is possible to rapidly move the lens to the minute focusing region through a first guide portion and to realize minute motion such as focusing lens in the minute focusing region through a second guide portion. That is, it is possible to realize minutely control the focus of the lens in a short time, which is practical and which is properly applied to a mobile telephone in which a small camera is mounted.

According to the present invention, it is possible to rapidly move the lens between the respective minute focusing regions by the first moving mechanism, to realize minute movement of focusing the lens in the respective minute focusing regions by the second moving mechanism, and to reduce the time required for focusing while realizing the minute movement of the lens, which is practical. Thus, the focusing device according to the present invention can be properly applied to a mobile telephone in which a small camera is mounted.

According to the focusing device of the present invention, since it is possible to rapidly move the lens to the minute focusing region by a simple structure, it is possible to satisfy needs that have not been satisfied by the conventional technology and to reduce the manufacturing cost, which is practical. Thus, the focusing apparatus according to the present invention can be properly applied to a mobile telephone in which a small camera is mounted.

DESCRIPTION OF THE PREFERRED EMBODIMENT

Figure 1:
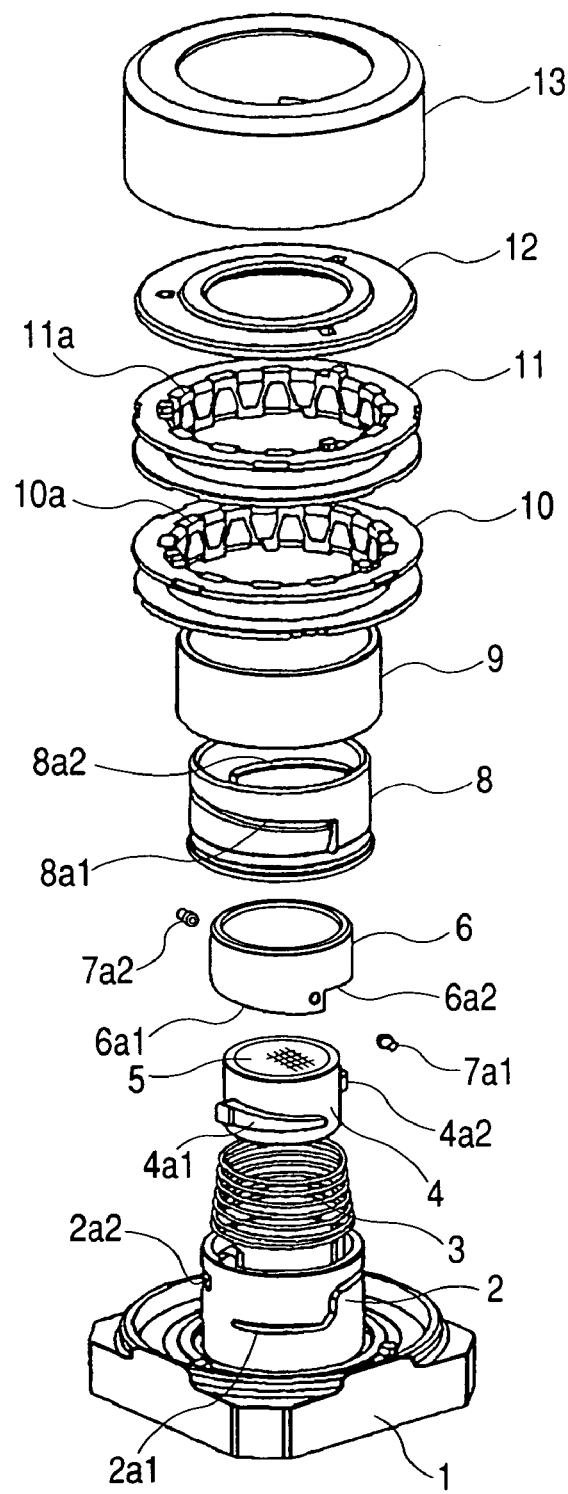
FIG. 1 is an exploded perspective view illustrating a first embodiment of a focusing device according to the present invention.
Figure 2:
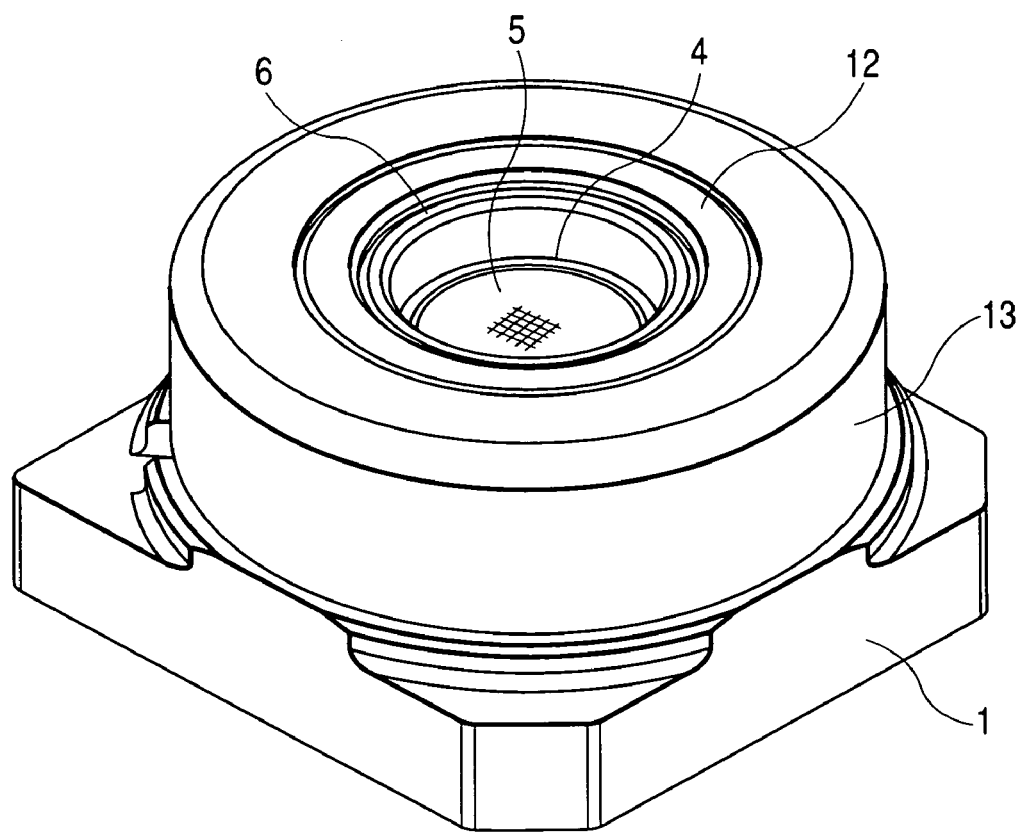
FIG. 2 is a perspective view illustrating the external appearance of the focusing device according to the present embodiment.
Figure 3:
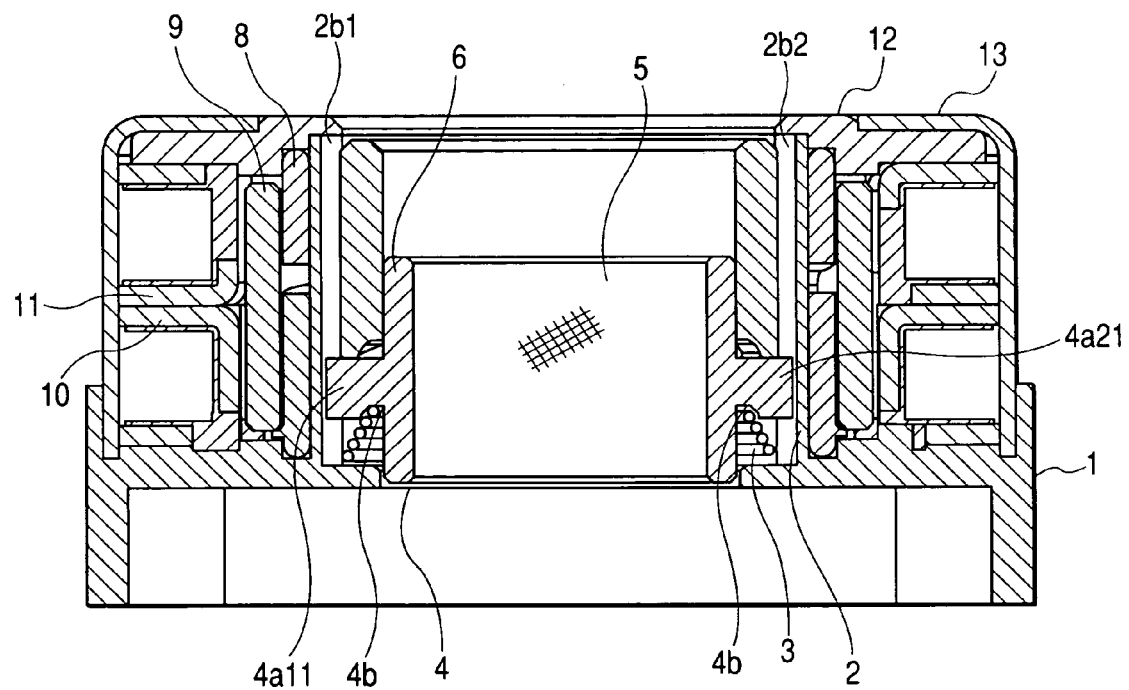
FIG. 3 is a vertical sectional view of the focusing device according to the present embodiment.

FIG. 1 is an exploded perspective view illustrating a focusing device according to the present embodiment. FIG. 2 is a perspective view illustrating the external appearance of the focusing device according to the present embodiment. FIG. 3 is a vertical sectional view illustrating the focusing device according to the present embodiment.

As illustrated in FIGS. 1 to 3, the focusing device according to the present embodiment comprises a lens 5 comprised of a plurality of lens pieces, a lens moving mechanism for moving the lens 5 in the optical-axis direction, and a hollow motor for driving the lens moving mechanism.

[Structure of Hollow Motor]

The hollow motor according to the present embodiment is formed of a claw-pole permanent magnet (PM) and comprises a base 1 having a cylindrical portion 2, a magnet 9 that is inserted into the cylindrical portion 2 to form a rotor, an outer cam 8 that forms a cylindrical member. The hollow motor further comprises bobbins 10 and 11 having magnetic pole teeth 10a and 11a, in which a coil (not shown) is wound to form a stator, a bearing made of an insulating substance, that is, an upper guide 12 for fixing the bobbins 10 and 11 and for allowing the magnet 9 and the outer cam 8 to rotate while regulating the movement in the axial direction of the magnet 9 and the outer cam 8 that is a rotor and the outer cam 8. And the hollow motor further comprises a cover 13 for covering the cylindrical portion 2, the outer cam 8, the magnet 9, the bobbins 10 and 11, and the upper guide 12, in which the cover 13 is fixed to the base 1. The outer cam 8 among the above-described components is made of a magnetic material and forms a back yoke. The cover 13 is also made of a magnetic material and forms an outer yoke. The magnet 9 is annular to be alternately magnetized to the S pole and the N pole in the circumferential direction.

Figure 4:
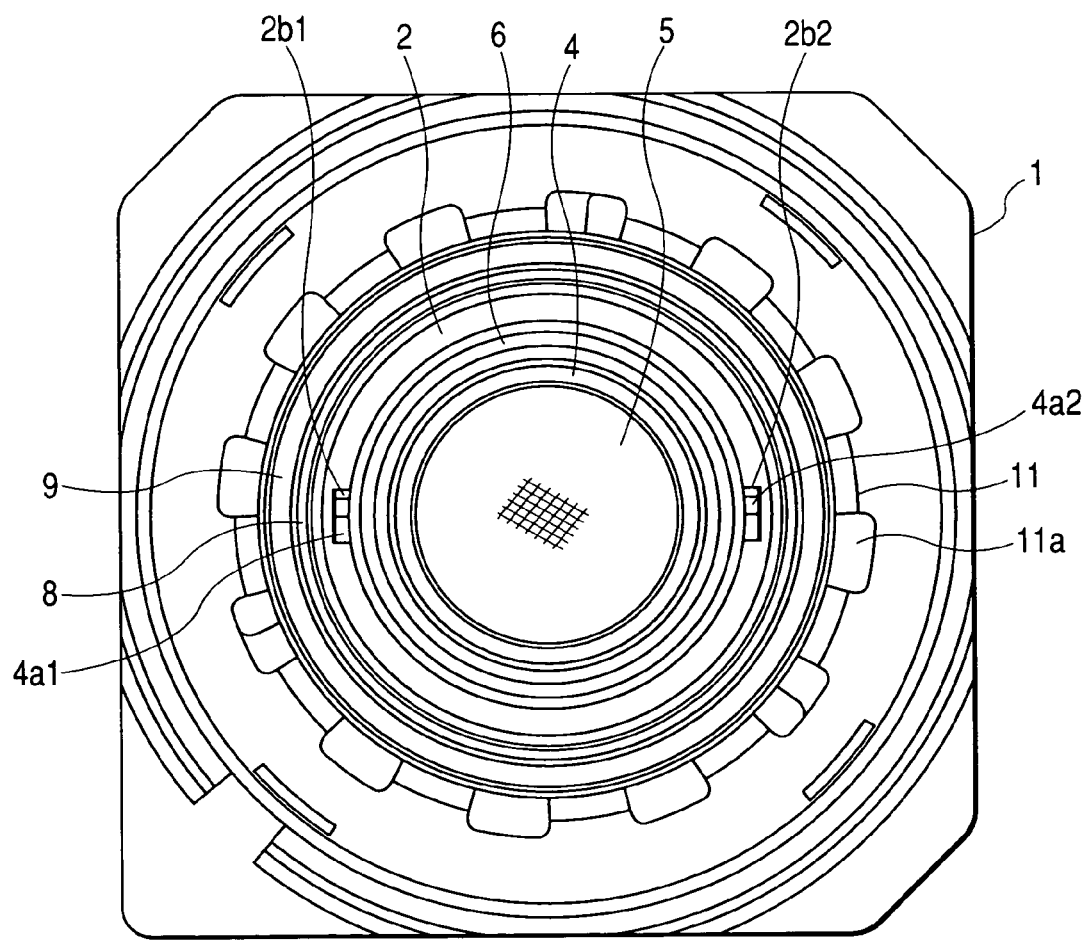
FIG. 4 is a plan view illustrating a state in which a cover and an upper guide are removed from the focusing device according to the present embodiment.
Figure 5:
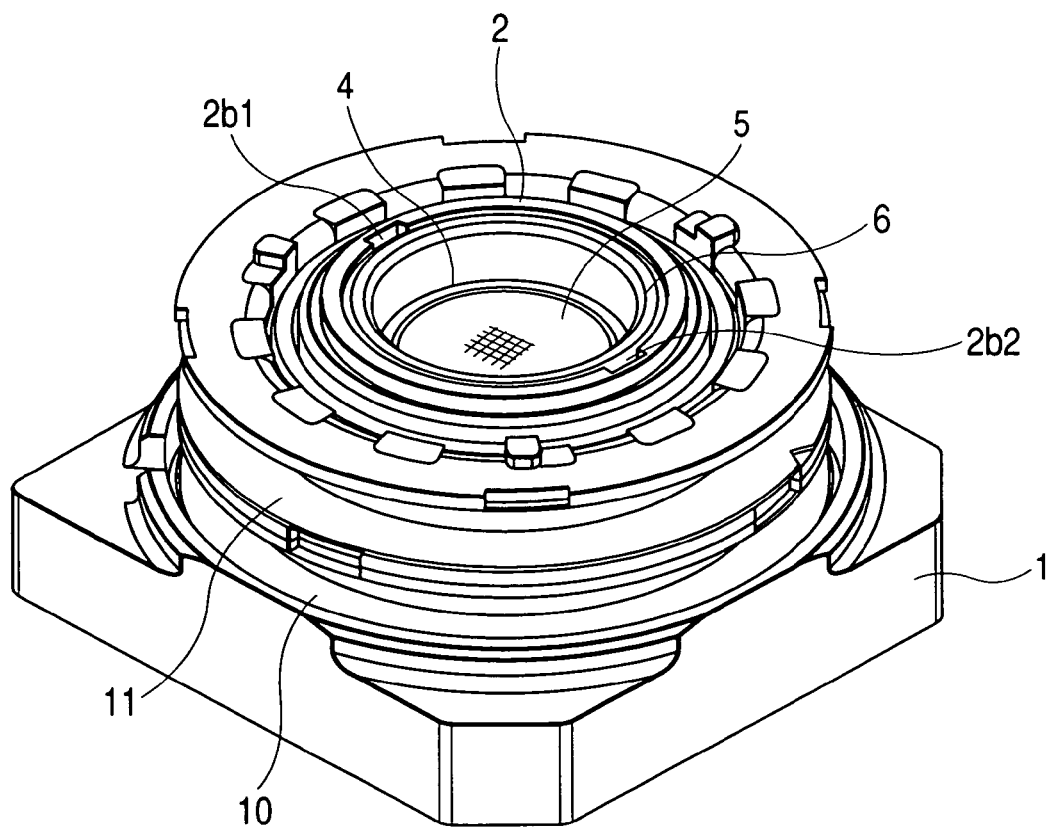
FIG. 5 is a perspective view illustrating a state in which the cover and the upper guide are removed from the focusing device according to the present embodiment.
Figure 6:
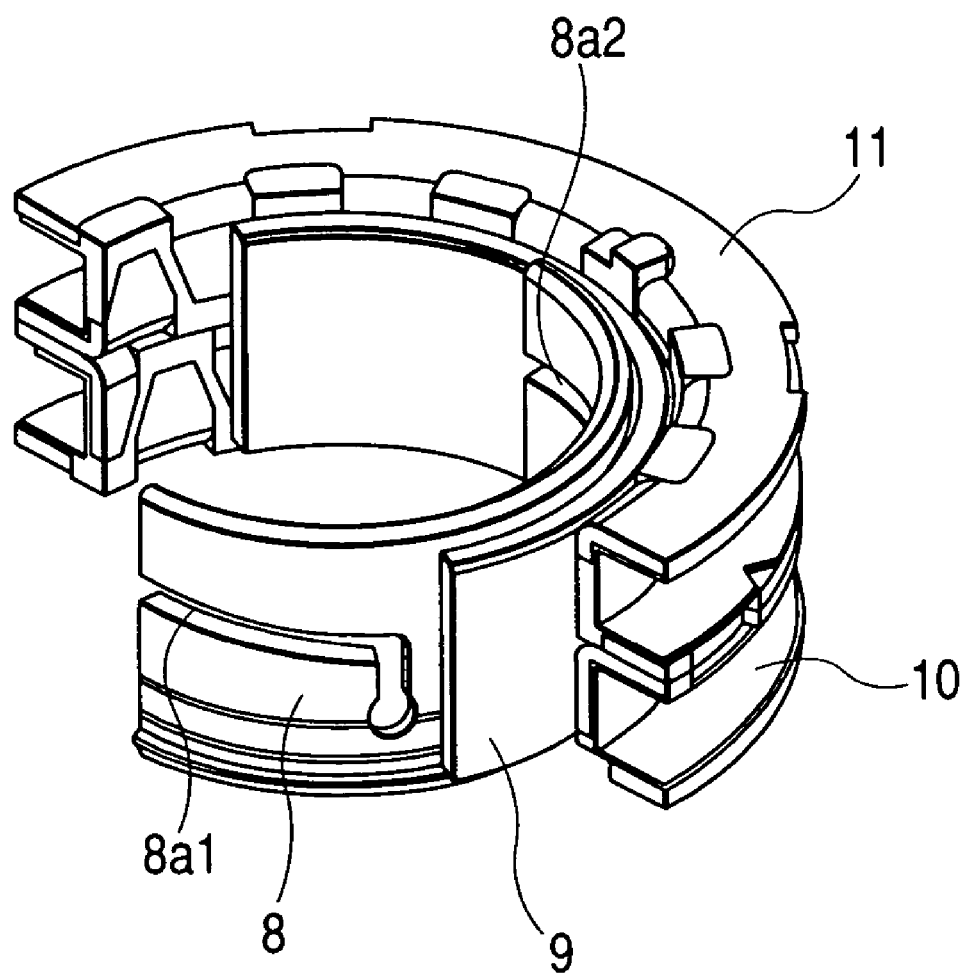
FIG. 6 is a perspective view of the principal parts illustrating a connection relationship among an inner cam, a magnet, and a bobbin included in the focusing device according to the present embodiment.
Figure 7:
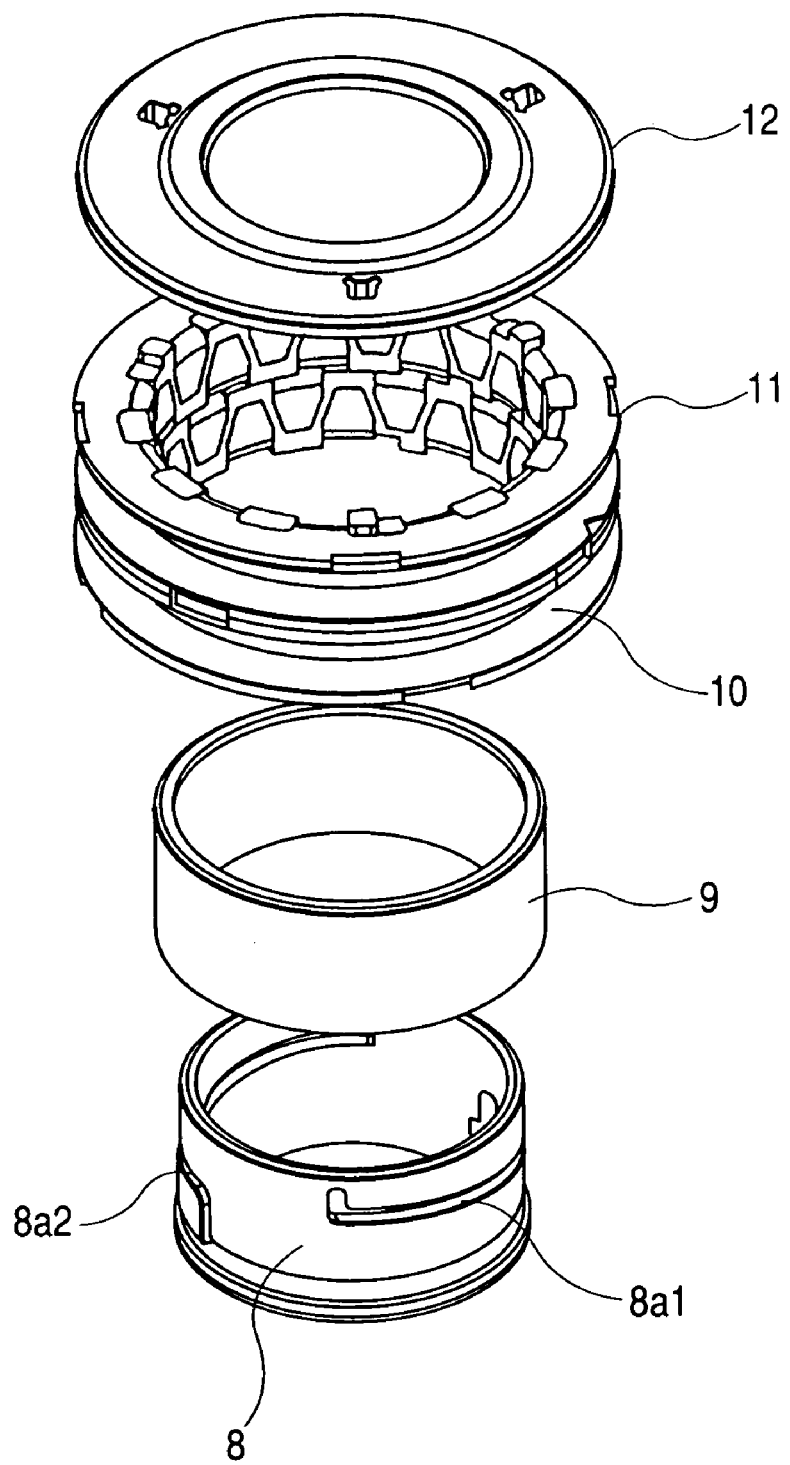
FIG. 7 is an exploded perspective view illustrating the principal parts of a hollow motor included in the focusing device according to the present embodiment.

FIG. 4 is a plan view illustrating a state in which a cover and an upper guide are removed from the focusing device according to the present embodiment. FIG. 5 is a perspective view illustrating a state in which the cover and the upper guide are removed from the focusing device according to the present embodiment. FIG. 6 is a perspective view of the principal parts illustrating a connection relationship between an inner cam, a magnet, and bobbins included in the focusing device according to the present embodiment. FIG. 7 is an exploded perspective view illustrating the principal parts of a hollow motor included in the focusing device according to the present embodiment.

As illustrated in FIGS. 3 to 6, the outer cam 8 and the magnet 9 that constitute the rotor such that the magnet 9 is fitted to the outer cam 8. The bobbins 10 and 11 are positioned so as to accommodate the rotor having such a structure and the upper guide 12 and the cover 13 are arranged so as to fix the bobbins 10 and 11.

[Lens Moving Mechanism]

Figure 8:
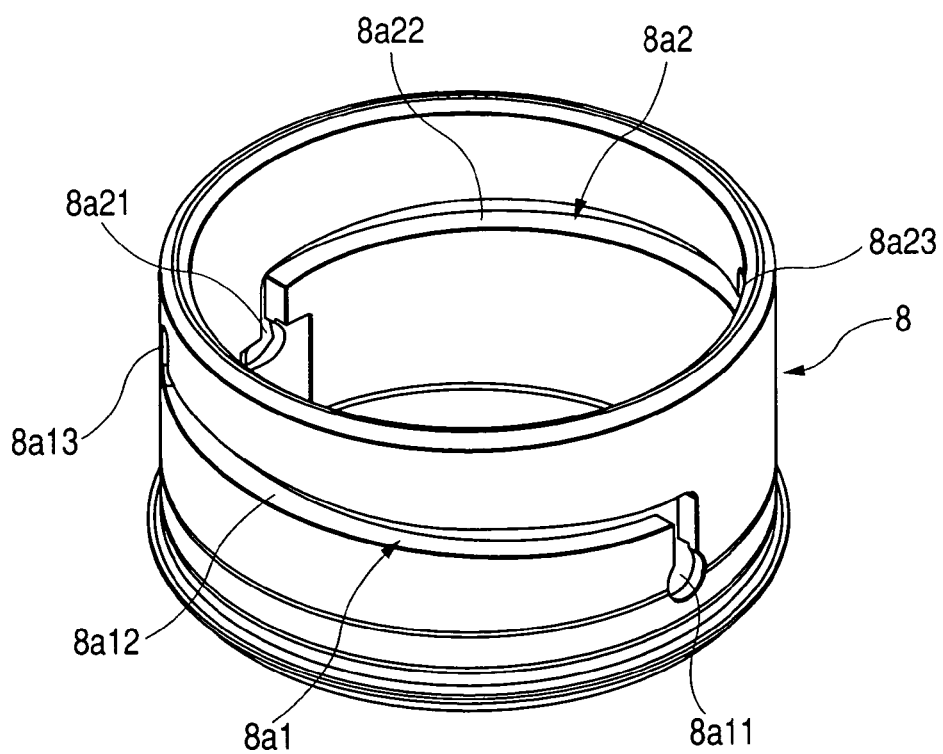
FIG. 8 is a perspective view illustrating an outer cam included in the focusing device according to the present embodiment.
Figure 9:
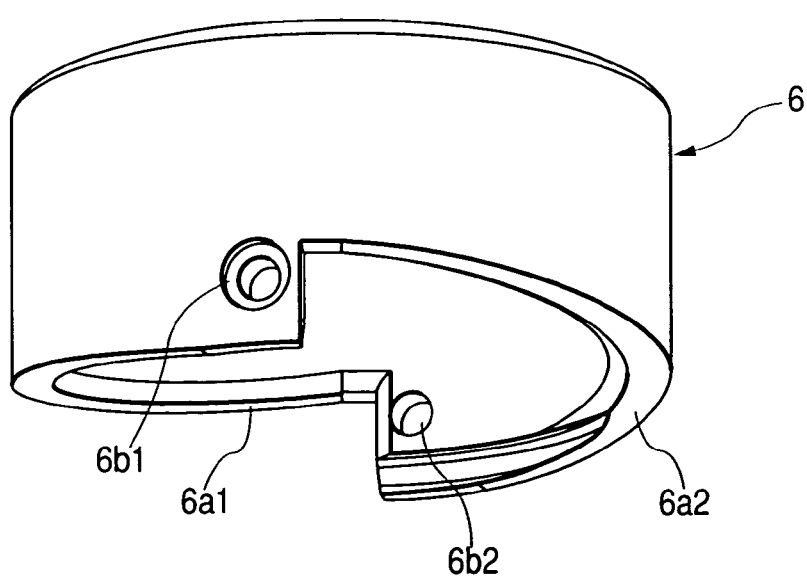
FIG. 9 is a perspective view illustrating an inner cam included in the focusing device according to the present embodiment.
Figure 10:
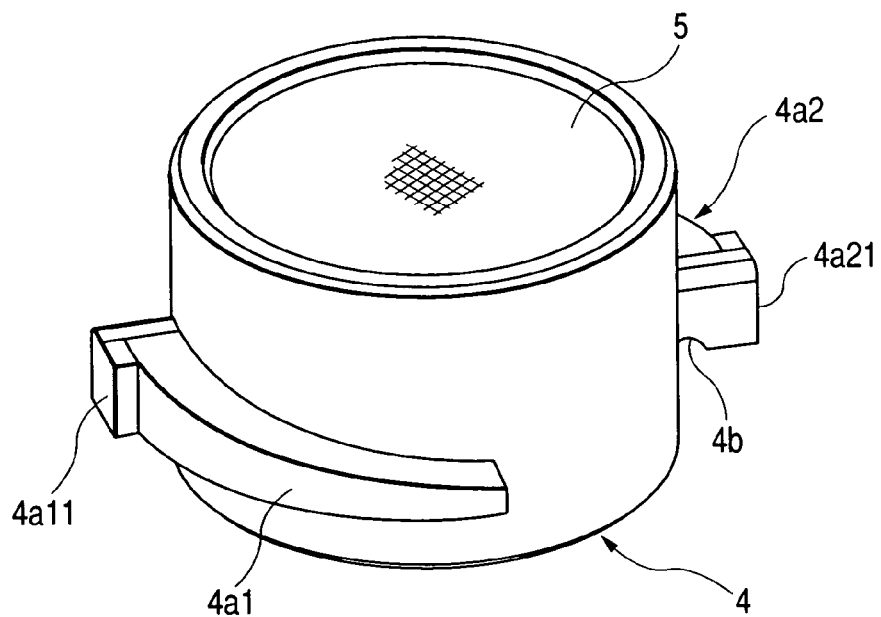
FIG. 10 is a perspective view illustrating a lens holder included in the focusing device according to the present embodiment.
Figure 11:
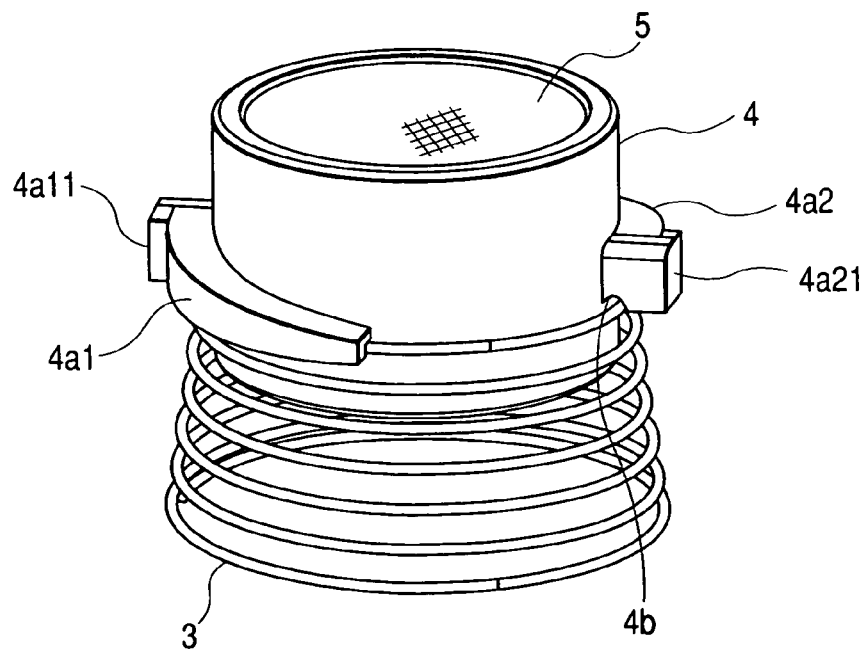
FIG. 11 is a perspective view illustrating an engagement relationship between a spring and the lens holder included in the focusing device according to the present embodiment.
Figure 12:
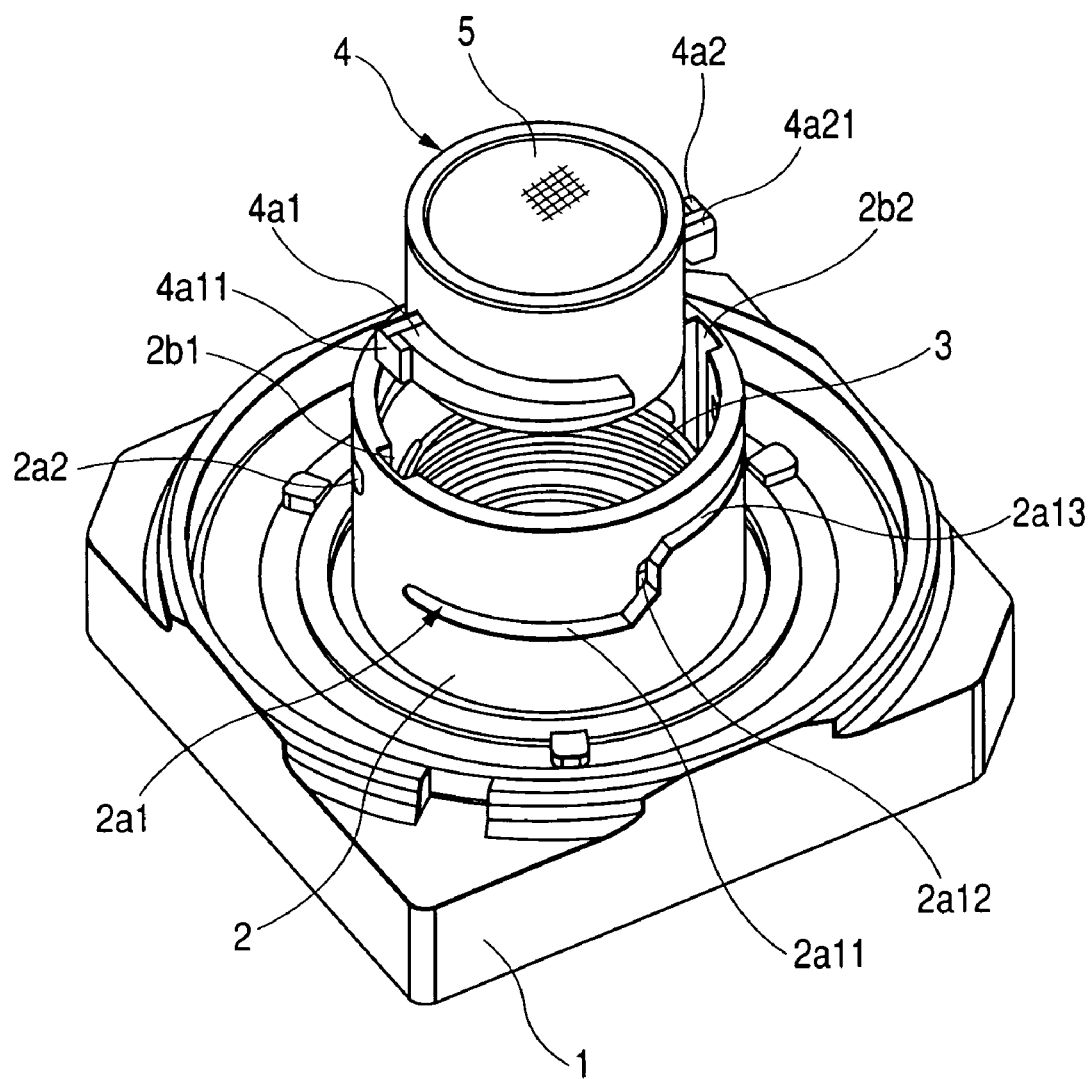
FIG. 12 is a perspective view illustrating a connection relationship among a base having a cylindrical portion, the spring, and the lens holder included in the focusing device according to the present embodiment.
Figure 13:
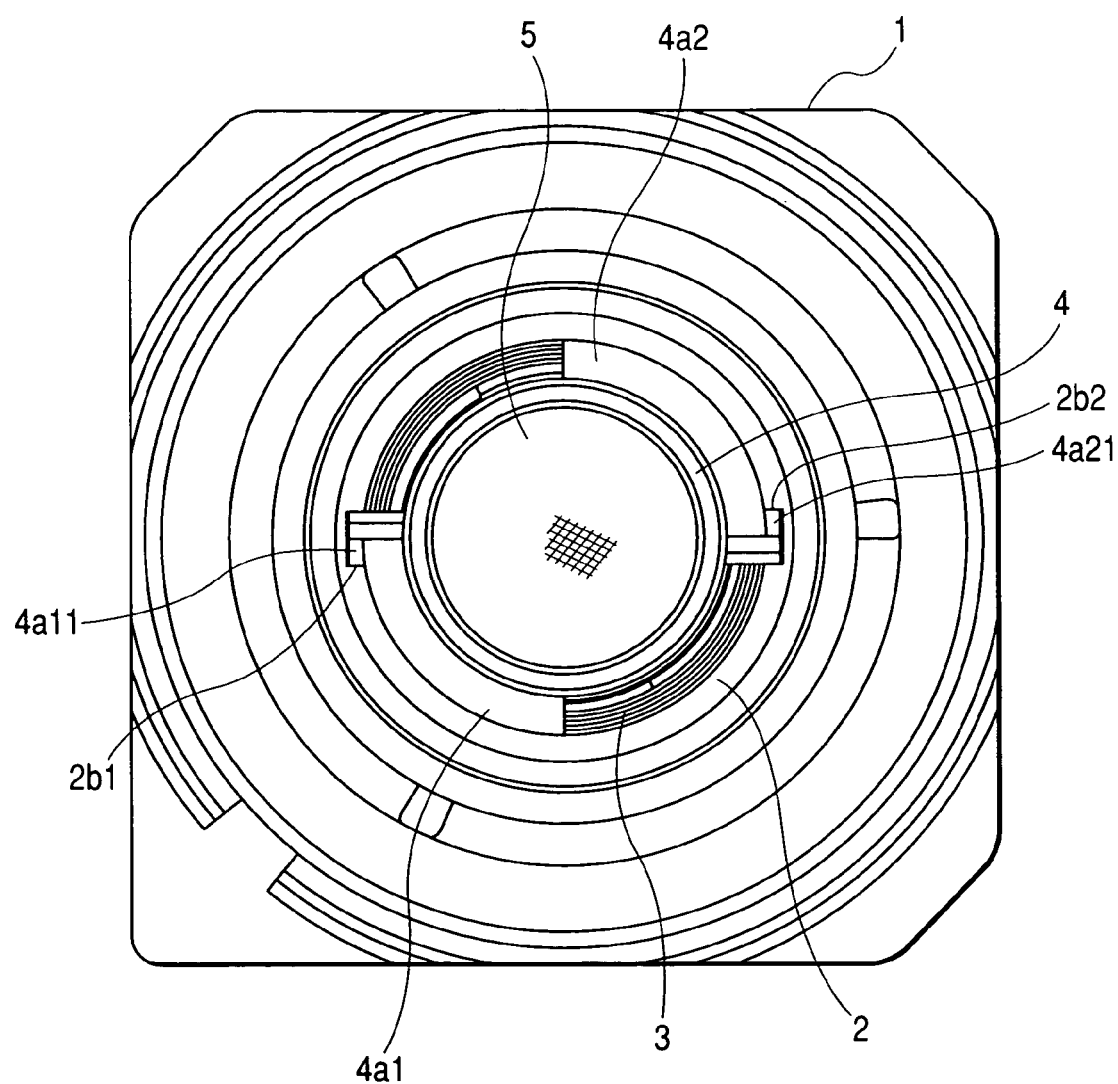
FIG. 13 is a plan view illustrating a connection relationship among the base having a cylindrical portion, the spring, and the lens holder included in the focusing device according to the present embodiment.
Figure 14:
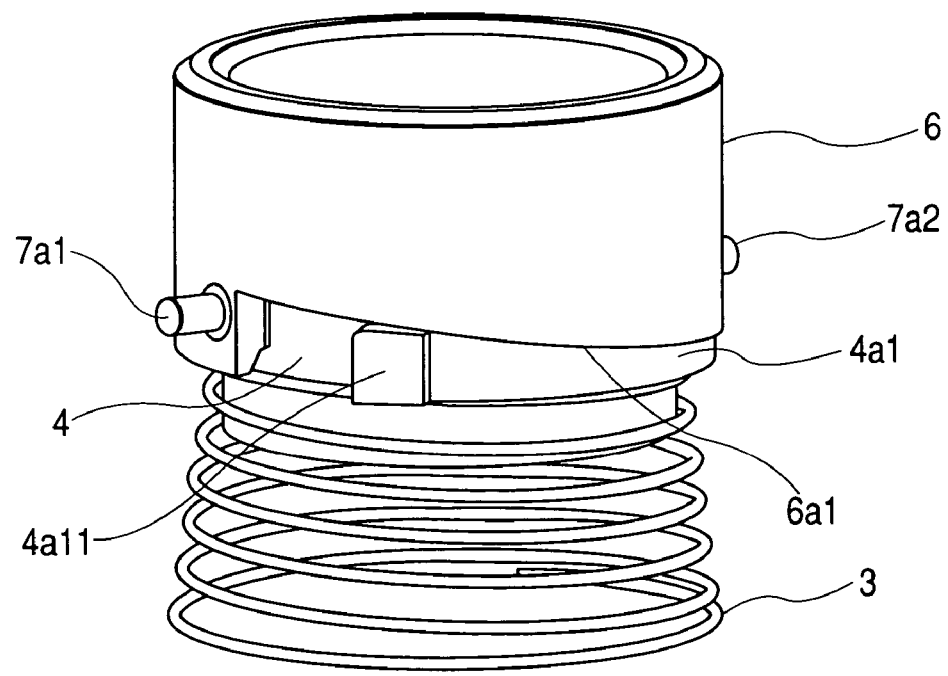
FIG. 14 is a perspective view illustrating an engagement relationship among the spring, the lens holder, and the inner cam included in the focusing device according to the present embodiment.
Figure 15:
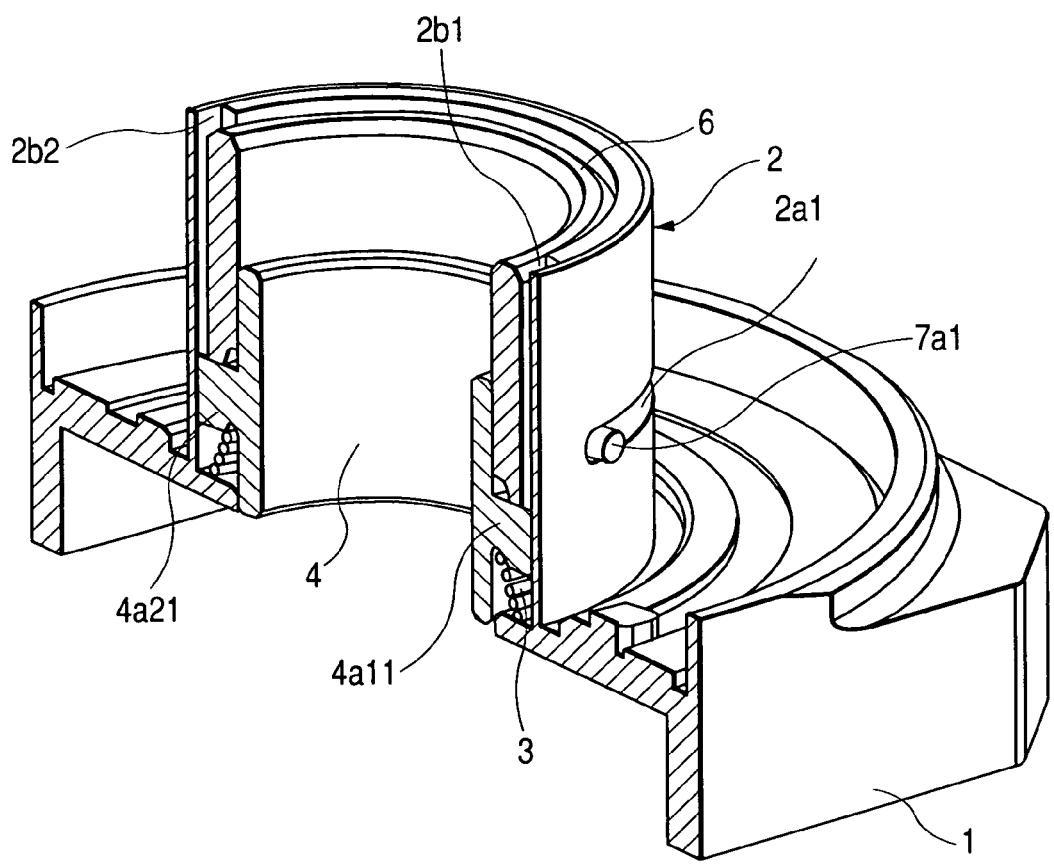
FIG. 15 is a perspective view of the principal parts illustrating a connection relationship among the base having a cylindrical portion, the spring, the lens holder, and the inner cam included in the focusing device according to the present embodiment.

FIG. 8 is a perspective view illustrating an outer cam included in the focusing device according to the present embodiment. FIG. 9 is a perspective view illustrating an inner cam included in the focusing device according to the present embodiment. FIG. 10 is a perspective view illustrating a lens holder included in the focusing device according to the present embodiment. FIG. 11 is a perspective view illustrating an engagement relationship between a spring and the lens holder included in the focusing device according to the present embodiment. FIG. 12 is a perspective view illustrating a connection relationship among a base having a cylindrical portion, the spring, and the lens holder included in the focusing device according to the present embodiment. FIG. 13 is a plan view illustrating a connection relationship among the base having a cylindrical portion, the spring, and the lens holder included in the focusing device according to the present embodiment. FIG. 14 is a perspective view illustrating an engagement relationship among the spring, the lens holder, and the inner cam included in the focusing device according to the present embodiment. FIG. 15 is a perspective view of the principal parts illustrating a connection relationship among the base having a cylindrical portion, the spring, the lens holder, and the inner cam included in the focusing device according to the present embodiment The lens 5 comprised of a plurality of lens pieces according to the present embodiment has two focusing positions such as a first focusing position and a second focusing position. The lens moving mechanism for moving the lens 5 in the optical-axis direction comprises the cylindrical portion 2 of the base 1, the lens holder 4 for holding the lens 5, a spring 3 for biasing the lens holder 4, an inner cam 6 that forms a guide cylinder, and the outer cam 8 that forms a cylindrical member.

The lens moving mechanism comprises a first moving mechanism for moving the lens 5 in the optical-axis direction by a first predetermined distance between a first minute focusing region, and a second minute focusing region and a second moving mechanism for minutely moving the lens 5 in the optical-axis direction by a second predetermined distance in the first and second minute focusing regions. The second predetermined distance is set to be smaller than the first predetermined distance. For example, the upper limit of the second predetermined distance is 500 μm, and the first predetermined distance is 2 mm.

As illustrated in FIG. 8, first guide grooves 8a1 and 8a2 are formed in the outer cam 8 that forms the inner circumferential surface of the rotor of the hollow motor. The first guide grooves 8a1 and 8a2 are axial symmetrical to have the same shape. For example, the first guide groove 8a1 includes a falling portion 8a11, a rising portion 8a13, and an inclined portion 8a12 for connecting the falling portion 8a11 to the rising portion 8a13. The first guide groove 8a2 also includes a falling portion 8a21, a rising portion 8a23, and an inclined portion 8a22. Among the components of the above-described first guide grooves 8a1 and 8a2, the inclined portions 8a12 and 8a22 are included in the above-described first moving mechanism and constitute a first guide portion for guiding the lens 5 in the optical-axis direction by the first predetermined distance between the first minute focusing region and the second minute focusing region. Difference in the heights of the inclined portions 8a12 and 8a22 of the above-described first guide grooves 8a1 and 8a2 is set to, for example, 2 mm corresponding to the first predetermined distance.

The inner cam 6 is arranged inside the outer cam 8. The lens holder 4 for holding the lens 5 is pressed by the spring 3 to always abut on the inner cam 6. The spring 3 has a shape obtained by removing the upper portion of a cone and is accommodated in the cylindrical portion 2 of the base 1.

As illustrated in FIG. 12, second guide grooves 2a1 and 2a2 are formed to be axial symmetrical in the cylindrical portion 2 of the base. The second guide groove 2a1 includes a first horizontal groove portion 2a11 the extends in the circumferential direction perpendicularly to the shaft center direction that coincides with the optical-axis direction of the lens 5, a second horizontal groove portion 2a13 formed to be parallel to the first horizontal groove portion 2a11, and a vertical groove portion 2a12 for connecting the first horizontal groove portion 2a11 to the second horizontal groove portion 2a13. The second guide groove portion 2a2 has the same structure. The above-described vertical groove portion 2a12 is set to have the length of 2 mm corresponding to the above-described first predetermined distance.

As illustrated in FIG. 10, a first cam 4a1 and a second cam 4a2 are axial symmetrically formed on the outer circumferential surface of the above-described lens holder 4. The cams 4a1 and 4a2 are included in the above-described second moving mechanism and constitute a second guide portion for guiding the lens 5 to minutely move in the optical-axis direction by the second predetermined distance. The top surfaces of the first cam 4a1 and the second cam 4a2 illustrated in FIG. 10 are inclined to have difference in heights, which is set to, for example, 500 μm corresponding to the upper limit of the above-described second predetermined distance.

A first protrusion 4a11 and a second protrusion 4a21 are formed on one end of each of the first cam 4a1 and the second cam 4a2 of the lens holder 4. As illustrated in FIGS. 3 and 4, the first protrusion 4a11 and the second protrusion 4a21 are formed on the cylindrical portion 2 of the base 1 and are accommodated in a first guide hole 2b1 and a second guide hole 2b2 that extend along the optical-axis direction to be movable only in the optical-axis direction. The protrusions 4a11 and 4a21 of the cams 4a1 and 4a2, and the guide holes 2b1 and 2b2 of the cylindrical portion 2 constitute regulating means for moving the lens holder 4 in the optical-axis direction and for stopping the rotation of the lens holder 4.

As illustrated in FIGS. 3, 10, and 11, a cutout 4b, with which the spring 3 is engaged, is formed on the bottom of each of the cams 4a1 and 4a2 of the lens holder 4. The tip of the spring 3 is accommodated in the cutout 4b.

A first engaging portion 6a1 and a second engaging portion 6a2 that always abut on the cams 4a1 and 4a2 of the lens holder 4 are axial symmetrically formed in the inner cam 6 which is fitted to the lens holder 4 to move by interlocking with the lens holder 4 in the lower portion of FIG. 9. The engaging units 6a1 and 6a2 have the same shape and are formed on the surfaces obtained by transcribing the abutment surfaces of the cams 4a1 and 4a2. The lengths of the surfaces of the first engaging portion 6a1 and the second engaging portion 6a2 are determined, for example, as twice the lengths of the cams 4a1 and 4a2. Further, the difference in the heights between the first engaging portion 6a1 and the second engaging portion 6a2 is set to 1 mm, which is twice 500 μm.

A first hole 6b1, to which a first guide protrusion 7a1 formed of a pin is inserted, and a second hole 6b2, to which a second guide protrusion 7a2 formed of a pin is inserted, are formed in the inner cam 6. The first hole 6b1 and the second hole 6b2 are axial symmetrically arranged.

As illustrated in FIG. 15, the first guide protrusion 7a1 inserted into the first hole 6b1 of the inner cam 6 and protruding from the outer circumferential surface of the inner cam 6 is formed to have a shape and a size such that the first guide protrusion 7a1 is engaged with the second guide groove 2a1 of the cylindrical portion 2 of the base 1 and is engaged with the first guide groove 8a1 of the outer cam 8 arranged outside the cylindrical portion 2. The second guide protrusion 7a2 inserted into the second hole 6b2 of the inner cam 6 and protruding from the outer circumferential surface of the inner cam 6 is formed to have a shape and a size such that the second guide protrusion 7a2 is engaged with the second guide groove 2a2 of the cylindrical portion 2 of the base 1 and is engaged with the first guide groove 8a2 of the outer cam 8.

Among the above-described components, the vertical groove portion 2a12 that forms the second guide grooves 2a1 and 2a2 of the cylindrical portion 2 of the base 1, the first guide protrusion 7a1, the second guide protrusion 7a2, and inclined portions 8a12 and 8a22 that form the first guide portion of the first guide grooves 8a1 and 8a2 of the outer cam 8 that is a cylindrical member, constitute the above-described first moving mechanism included in the lens moving mechanism, that is, the first moving mechanism for moving the lens 5 by the first predetermined distance between the first minute focusing region and the second minute focusing region, for example, 2 mm.

Among the above-described components, the first horizontal groove portion 2a11 and the second horizontal groove portion 2a13 of the second guide grooves 2a1 and 2a2 of the cylindrical portion 2 of the base 1, the first cam 4a1 and the second cam 4a2 of the lens holder 4, the first engaging portion 6a1 and the second engaging portion 6a2 of the inner cam 6 that is a guide cylinder, the first guide protrusion 7a1, the second guide protrusion 7a2, the falling portion 8a11 and the rising portion 8a13 of the first guide groove 8a1 of the outer cam 8, and the falling portion 8a21 and the rising portion 8a23 of the first guide groove 8a2, constitute the above-described second moving mechanism included in the lens moving mechanism, that is, the second moving mechanism for minutely moving the lens 5 in the optical-axis direction by the second predetermined distance between the first minute focusing region and the second minute focusing region, whose upper limit is, for example, 500 μm.

[Operation of Present Embodiment]

According to the present embodiment, in order to secure the stability of the lens holder 4 during movement, that is, the stability of the lens 5 during movement, as described above, the first moving mechanism of the lens moving mechanism is comprised of two groups of axial symmetrical components, and the second moving mechanism is also comprised of two groups of axial symmetrical components.

That is, a first group of the first moving mechanism comprises the vertical groove portion 2a12 that forms the second guide groove 2a1 of the cylindrical portion 2 of the base 1, the first guide protrusion 7a1, the inclined portion 8a12 of the first guide groove 8a1 of the outer cam 8. A second group comprises a vertical groove portion (not shown) that forms the second guide groove 2a2 of the cylindrical portion 2 of the base 1, the second guide protrusion 7a2, and the inclined portion 8a22 of the first guide groove 8a2 of the outer cam 8. Since the operation of the first group is the same as the operation of the second group, only the operation of the first group will now be described.

That is, a first group of the second moving mechanism comprises the first groove portion 2a11 and the second horizontal groove portion 2a13 of the second guide groove 2a1 of the cylindrical portion 2 of the base 1, the first cam 4a1 of the lens holder 4, the first engaging portion 6a1 of the inner cam 6, the first guide protrusion 7a1, and the falling portion 8a11 and the rising portion 8a13 of the first guide groove 8a1 of the outer cam 8. A second group comprises a first horizontal groove portion and a second horizontal groove portion (not shown) that form the second guide groove 2a2 of the cylindrical portion 2 of the base 1, the second cam 4a2 of the lens holder 4, the second engaging portion 6a2 of the inner cam 6, the second guide protrusion 7a2, and the falling portion 8a21 and the rising portion 8a23 of the first guide groove 8a2 of the outer cam 8. Since the operation of the first group is the same as the operation of the second group, only the operation of the first group will now be described.

Figure 16:
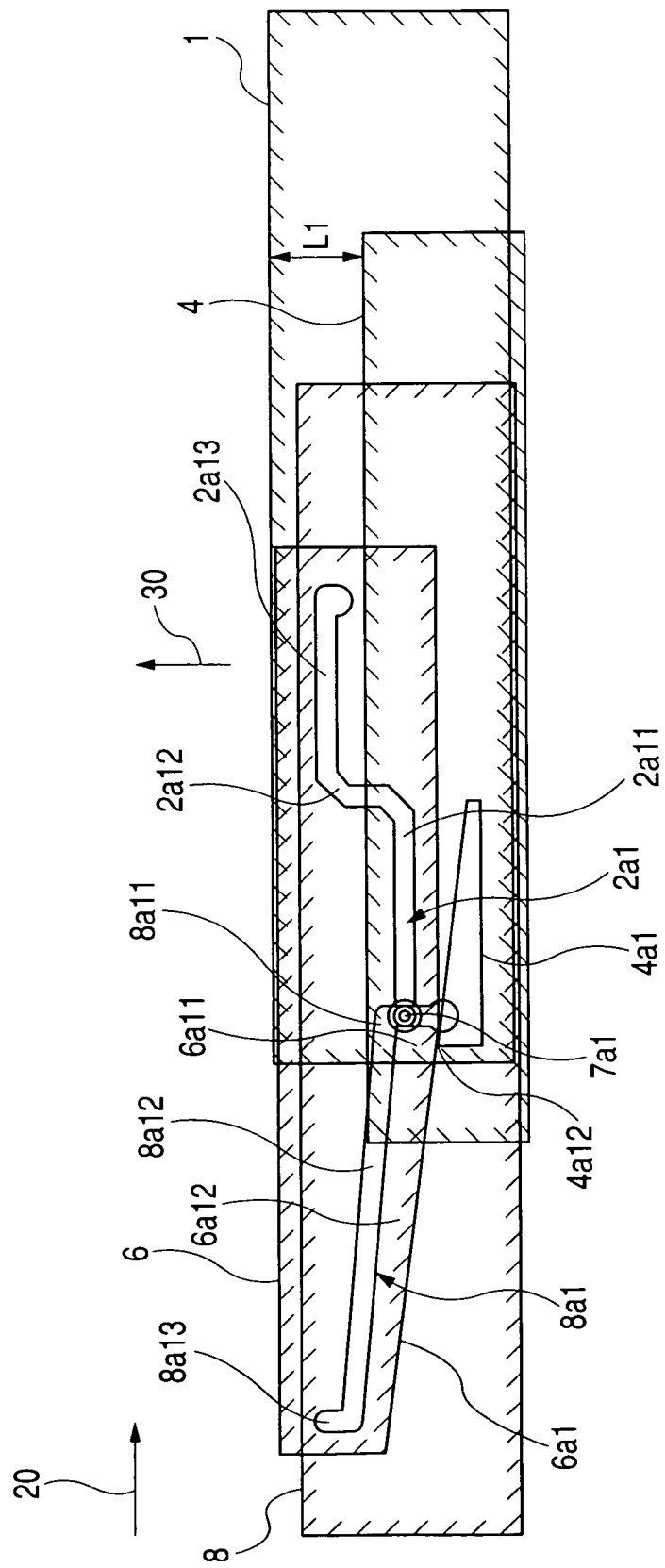
FIG. 16 is a view illustrating the operation of the focusing device according to the present embodiment, which is a development view of the principal parts illustrating a state in which the lens holder is positioned in a first predetermined stand-by position.

FIGS. 16 to 20 are views illustrating the operations of the focusing device according to the present embodiment. FIG. 16 is a development view of the principal parts illustrating a state in which the lens holder is positioned in a first predetermined stand-by position. The first stand-by position is the accommodation position. The lens holder 4, that is, the lens 5 is accommodated so as to be closest to the base 1. The first guide protrusion 7a1 fixed to the inner cam 6 is positioned on the end of the first horizontal groove portion 2a11 of the second guide groove 2a1 of the cylindrical portion 2 of the base 1 and in the falling portion 8a11 of the first guide groove 8a1 of the outer cam 8. The upper end 4a12 of the first cam 4a1 of the lens holder 4 abuts on the lower end 6a11 of the first engaging portion 6a1 of the inner cam 6 by the force of a spring (not shown).

Figure 17:
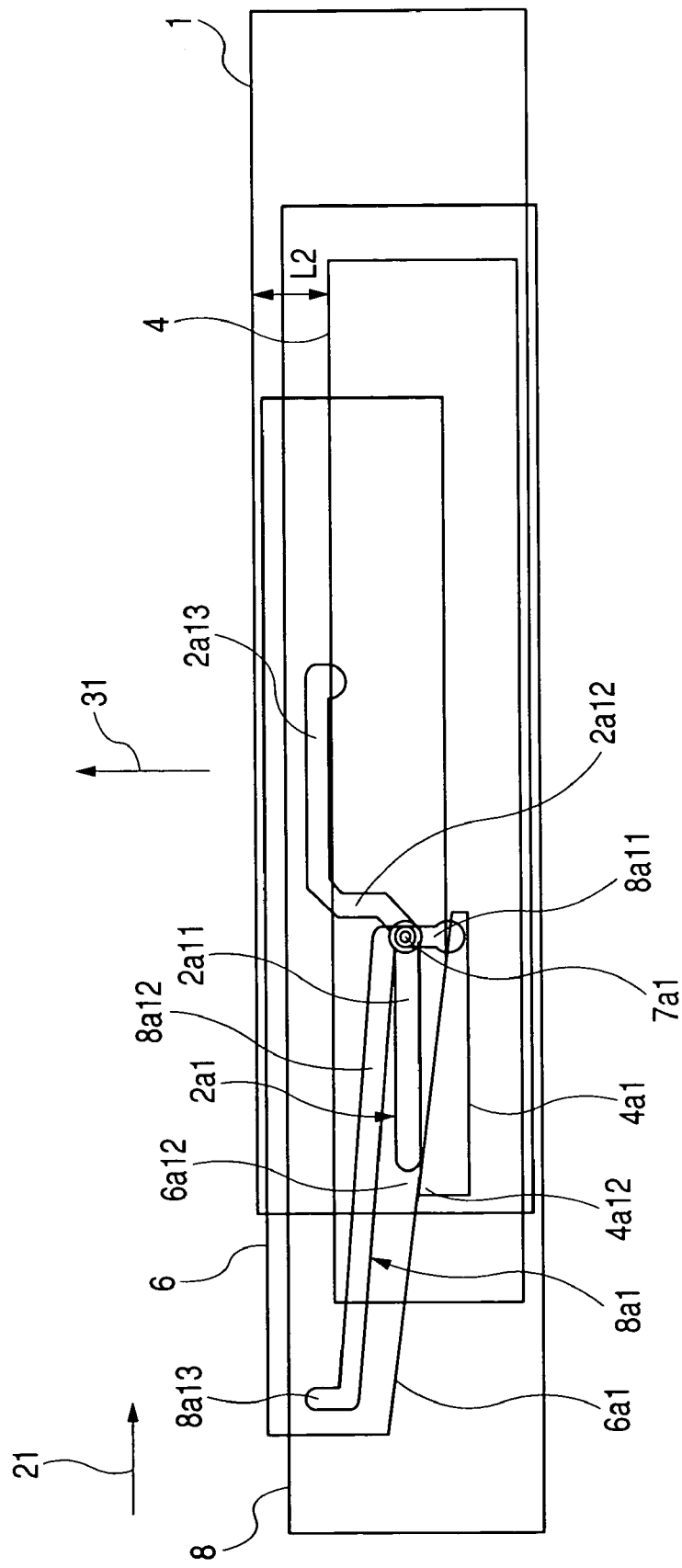
FIG. 17 is a view illustrating the operation of the focusing device according to the present embodiment, which is a development view of the principal parts illustrating a state in which the lens holder is minutely controlled in a first minute focusing region.

FIG. 17 is a development view of the principal parts illustrating a state in which the lens holder is minutely controlled by moving from the first stand-by position to a first minute focusing region. In the state illustrated in FIG. 16, when the hollow motor is driven to rotate the rotor, that is, the outer cam 8 rotates in the direction of the arrow 20 of FIG. 16, the first guide protrusion 7a1 is pressed by the edge of the falling portion 8a11 of the first guide groove 8a1 of the outer cam 8, such that the inner cam 6 integrated with the outer cam 8 rotates in the direction of the arrow 20. During such operations, the first guide protrusion 7a1 moves inside the first horizontal groove portion 2a11 of the second guide groove 2a1 of the cylindrical portion 2 of the base 1, such that the inner cam 6 does not move in the optical-axis direction. Due to the rotation of the inner cam 6, the upper end 4a12 of the first cam 4a1 of the lens holder 4 relatively moves from the lower end 6a11 of the first engaging portion 6a1 of the inner cam 6 toward a central portion 6a12. During such operations, the movement of the first protrusion 4a11 and the second protrusion 4a21 in the rotation direction are regulated by the first guide hole 2b1 and the second guide hole 2b2 of the cylindrical portion 2 due to the force of the spring 3, such that the lens holder 4 proceeds, for example, by 500 μm in the optical-axis direction marked with the arrow 30 of FIG. 16. During such operations, the lens 5 is minutely controlled in the first minute focusing region. When the distance between the top surface of the base 1 and the top surface of the lens holder 4 illustrated in FIG. 16 is denoted by L1 and the distance between the top surface of the base 1 and the top surface of the lens holder 4 illustrated in FIG. 17 is denoted by L2, L1−L2=500 μm.

In the state illustrated in FIG. 17, the first guide protrusion 7a1 fixed to the inner cam 6 reaches the lowermost portion of the vertical groove portion 2a12 of the second guide groove 2a1 of the cylindrical portion 2 of the base 1. The first guide protrusion 7a1 reaches the lowermost portion of the inclined portion 8a12 of the first guide groove 8a1 of the outer cam 8. At this time, as described above, the upper end 4a12 of the first cam 4a1 of the lens holder 4 abuts on the central portion 6a12 of the first engaging portion 6a1 of the inner cam 6.

Figure 18:
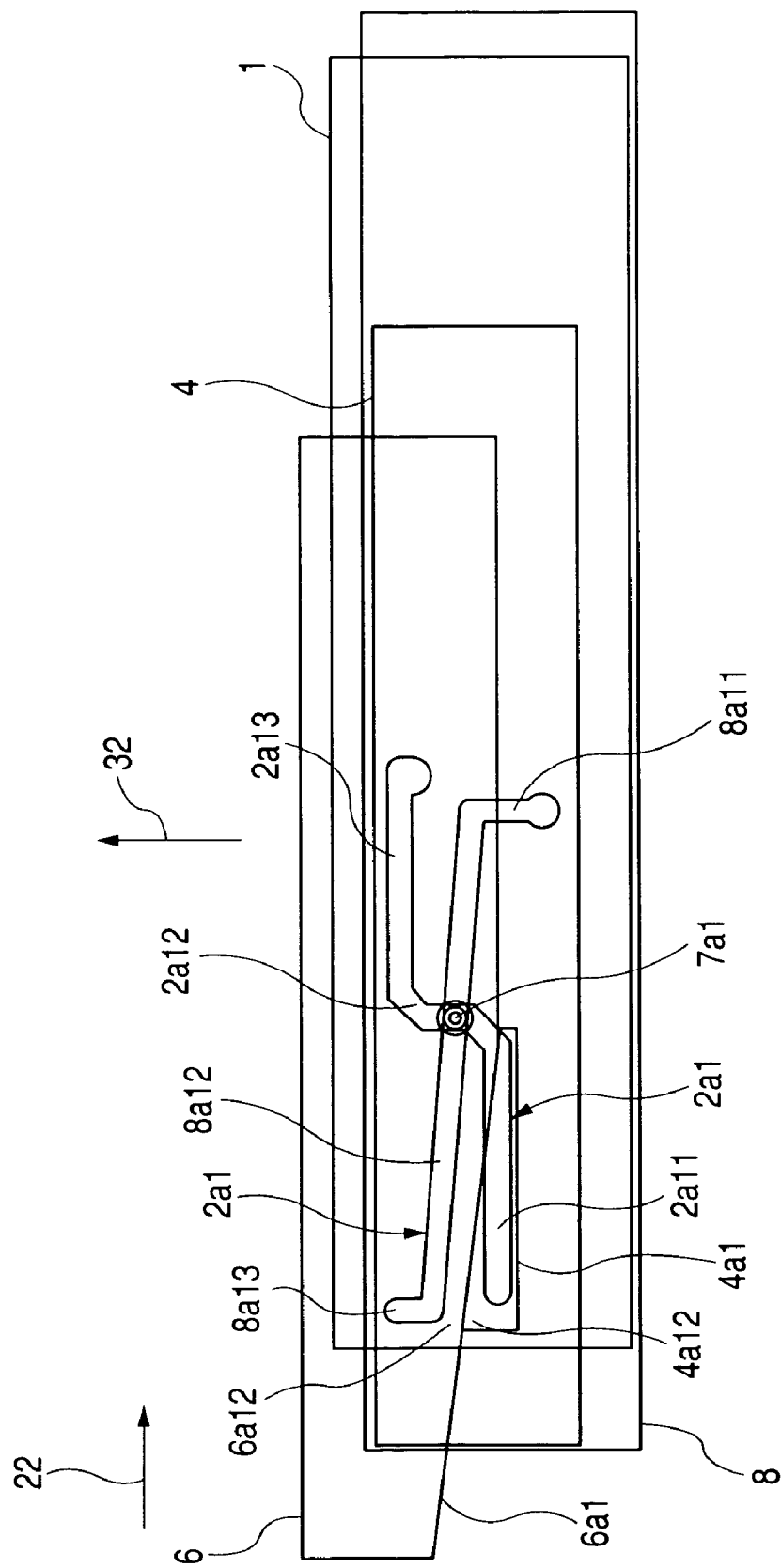
FIG. 18 is a view illustrating the operation of the focusing device according to the present embodiment, which is a development view of the principal parts illustrating a state in which the lens holder proceeds from a first minute focusing region to a second minute focusing region.

FIG. 18 is a development view of the principal parts illustrating a state in which the lens holder proceeds from the first minute focusing region to the second minute focusing region. In the state illustrated in FIG. 17, when the outer cam 8 continuously rotates as described by the arrow 21 of FIG. 17 from the state illustrated in FIG. 17, the first guide protrusion 7a1 fixed to the inner cam 6 rises inside the vertical groove portion 2a12 of the second guide groove 2a1 of the cylindrical portion 2 and, at the same time, rises inside the inclined portion 8a12 of the first guide groove 8a1 of the outer cam 8. The lens holder 4 proceeds from the first minute focusing region toward the second minute focusing region as described by the arrow 31 of FIG. 17 by the force of the spring 3 by interlocking with the rise of the first guide protrusion 7a1 to be in the state illustrated in FIG. 18. During such operation, the lens holder 4 and the inner cam 6 are maintained such that relative transition is not generated between the first cam 4a1 of the lens holder 4 and the first engaging portion 6a1 of the inner cam 6.

Figure 19:
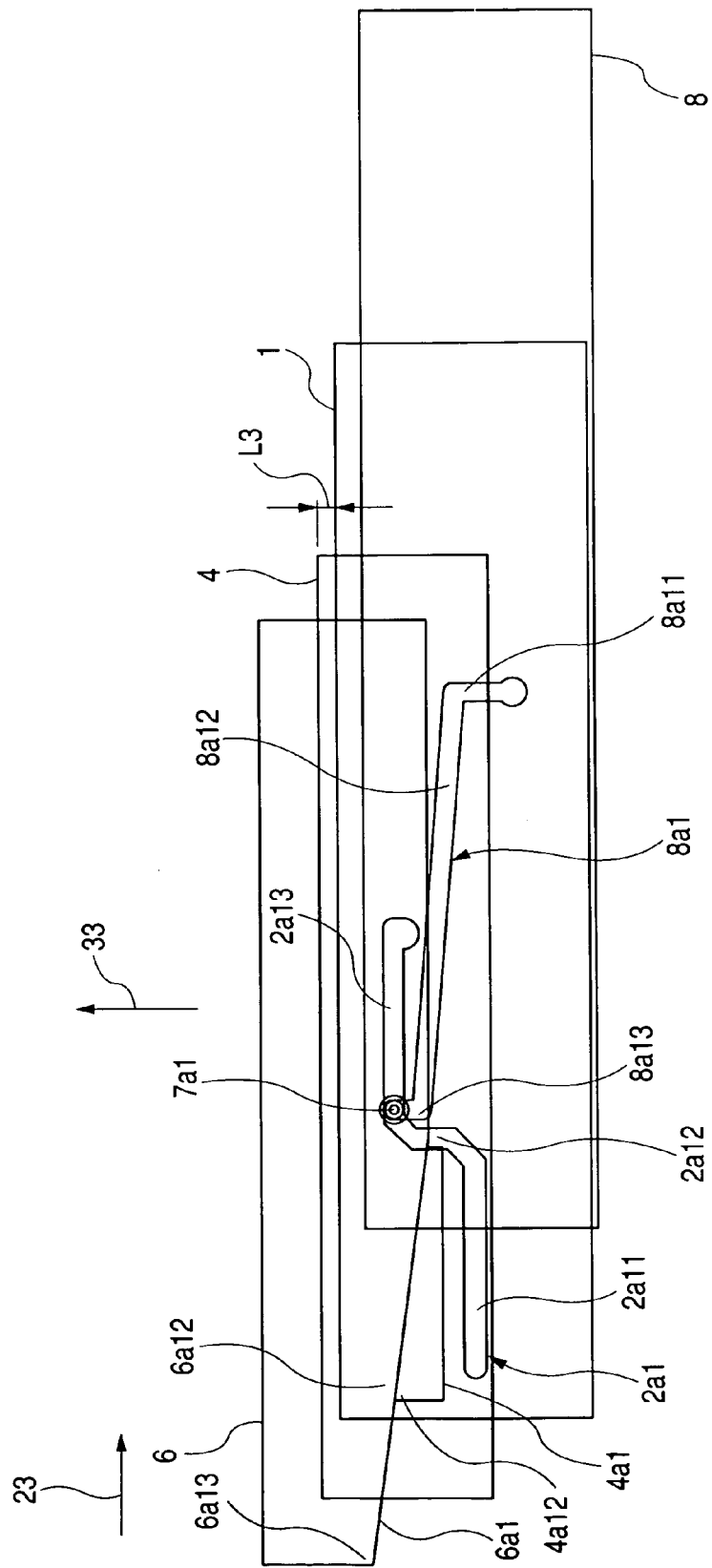
FIG. 19 is a view illustrating the operation of the focusing device according to the present embodiment, which is a development view of the principal parts illustrating a state in which the lens holder proceeds to the second minute focusing region.

FIG. 19 is a development view of the principal parts illustrating a state in which the lens holder proceeds to the second minute focusing region. In the state illustrated in FIG. 18, when the outer cam 8 continuously rotates as described by the arrow 22 of FIG. 18, the first guide protrusion 7a1 fixed to the inner cam 6 reaches the uppermost portion of the vertical groove portion 2a12 of the second guide groove 2a1 of the cylindrical portion 2 of the base 1. The first guide protrusion 7a1 reaches the rising portion 8a13 beyond the uppermost portion of the inclined portion 8a12 of the first guide groove 8a1 of the outer cam 8. That is, the inner cam 6 proceeds through the first guide protrusion 7a1 as described by the arrow 32 of FIG. 18. In accordance with such an operation, the lens holder 4 proceeds by 2 mm from the first minute focusing region due to the force of the spring 3 to reach the second minute focusing region as illustrated in FIG. 19. When the distance between the top surface of the base 1 and the top surface of the lens holder 4 illustrated in FIG. 19 is denoted by L3, L2+L3=2 mm is established from the relationship between the distance L2 illustrated in FIG. 17 and the distance L3.

Figure 20:
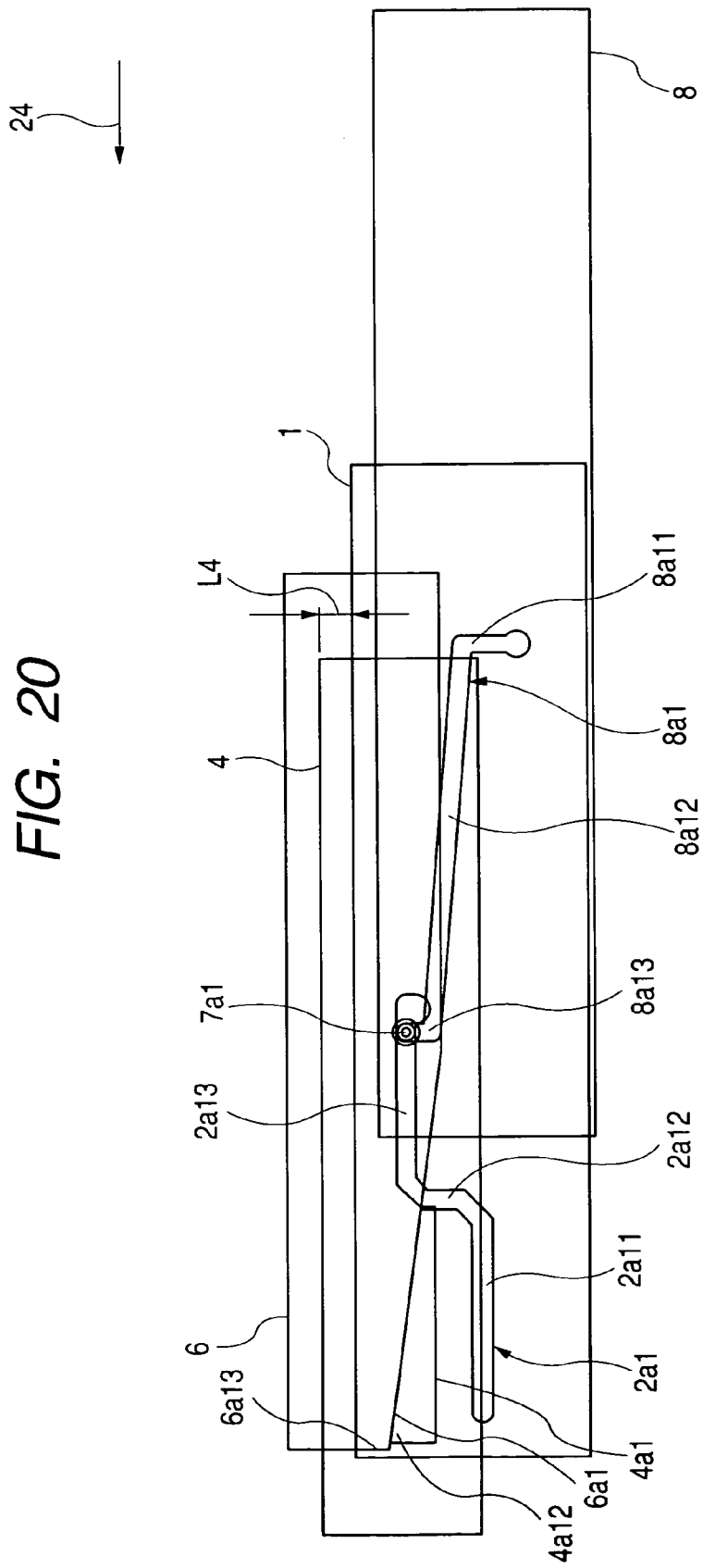
FIG. 20 is a view illustrating the operation of the focusing device according to the present embodiment, which illustrates a state in which the lens holder is minutely controlled in the second minute focusing region.

FIG. 20 is a view illustrating a state in which the lens holder is minutely controlled in the second minute focusing region. In the state illustrated in FIG. 19, when the outer cam 8 continuously rotates as described by the arrow 23 of FIG. 19, the first guide protrusion 7a1 is pressed by the edge of the rising portion 8a13 of the first guide groove 8a1 of the outer cam 8, such that the inner cam 6 integrated with the outer cam 8 rotates in the direction marked with the arrow 23 of FIG. 19. During such operations, the first guide protrusion 7a1 moves inside the second horizontal groove portion 2a13 of the second guide groove 2a1 of the cylindrical portion 2 of the base 1, such that the inner cam 6 does not move in the optical-axis direction. Further, due to the rotation of the inner cam 6, the upper end 4a12 of the first cam 4a1 of the lens holder 4 relatively moves from the central portion 6a12 of the first engaging portion 6a1 of the inner cam 6 toward the upper end 6a13. Due to such an operation, the lens holder 4 proceeds by, for example, 500 m as described by the arrow 33 of FIG. 19 in the optical-axis direction due to the force of the spring 3 to be in the state illustrated in FIG. 20. During such an operation, the lens 5 is minutely controlled in the second minute focusing region. When the distance between the top surface of the lens holder 4 and the top surface of the base 1 illustrated in FIG. 20 is denoted by L4, L4−L3=500 μm is established from the relationship between the distance L3 illustrated in FIG. 19 and the distance L4. The second minute focusing region illustrated in FIG. 20 is in the second stand-by position of the lens holder 4.

As described above, in the first minute focusing region, the lens holder 4 minutely moves by the second predetermined distance, that is, in the distance range where 500 μm is the upper limit to perform first minute focusing. The lens holder 4 proceeds from the first minute focusing region to the second minute focusing region by the first predetermined distance, that is, 2 mm. In the second minute focusing region, the lens holder 4 minutely moves by the second predetermined distance, that is, in the distance range where 500 μm is the upper limit to perform second minute focusing. Since the first guide protrusion 7a1 formed of a pin moves inside the vertical groove portion 2a12 of the cylindrical portion 2 of the base 1 and the inclined portion 8a12 of the outer cam 8, that is, the cam groove, the lens holder 4 can be rapidly moved by the first predetermined distance, 2 mm.

The operation of moving the lens holder 4 from the second stand-by position, that is, the second minute focusing region to the first minute focusing region is reverse to the above-described operation and is performed by driving the hollow motor so as to rotate the outer cam 8 in the direction of the arrow 24 of FIG. 20 from the state illustrated in FIG. 20.

As described above, according to the present embodiment, it is possible to rapidly move the lens 5 between the first minute focusing region and the second minute focusing region by 2 mm by the inclined portions 8a12 and 8a22 of the first guide grooves 8a1 and 8a2 of the outer cam 8, that is, the first guide portion included in the first moving mechanism of the lens moving mechanism. Also, it is possible to minutely move the lens 5 in the first minute focusing region and the second minute focusing region by the upper limit 500 μm by the second guide portion included in the second moving mechanism of the lens moving mechanism, that is, the first cam 4a1 and the second cam 4a2 of the lens holder 4. That is, it is possible to minutely move the lens 5 and to reduce the time required for focusing, which is practical. Thus, the focusing device according to the present embodiment can be properly applied to a mobile telephone in which a small camera is mounted.

The focusing device according to the present invention has a simple structure in which the inner cam 6 that is a guide cylinder including the first guide protrusion 7a1 and the second guide protrusion 7a2 engaged with the first guide grooves 8a1 and 8a2 formed in the outer cam 8, is provided between the lens holder 4 for holding the lens 5 and the outer cam 8 that is a cylindrical member included in the rotor of the hollow motor. Accordingly, it is possible to rapidly move the lens 5 held in the lens holder 4 in the optical-axis direction. That is, since the outer cam 8 that operates as the rotor of the hollow motor is used as a member that forms the first guide grooves 8a1 and 8a2, a member for forming a guide groove is not necessary, such that it is possible to simplify the structure of the focusing device and to reduce the manufacturing cost of the focusing device.

According to the present embodiment, since the cover 13 and the outer cam 8 that constitute the hollow motor are made of magnetic materials and function as yokes, it is possible to reduce the number of parts and to reduce the manufacturing cost.

According to the present embodiment, it is possible to change the second predetermined distance related to the minute controlling of the lens 5 by changing the shape and the size of the second guide unit, that is, the first cam 4a1 and the second cam 4a2 of the lens holder 4. Thus, it is possible to change the minute controlling amount of the lens 5 only by exchanging the lens holder 4 by providing a plurality of lens holders 4 in which the shapes and sizes of the second guide unit, that is, the first cam 4a1 and the second cam 4a2 are different from each other. That is, it is possible to change the minute controlling amount of the lens 5 by a simple structure.

Also, according to the present embodiment, it is possible to smoothly move the lens holder 4 in the optical-axis direction by the pressure of the spring 3 by providing the spring 3 that presses the lens holder 4 in the direction where the first cam 4a1 and the second cam 4a2 that are the second guide of the lens holder 4 are engaged with the first engaging portion 6a1 and the second engaging portion 6a2 of the inner cam 6 that is the guide cylinder and to thus secure high performance.

According to the present invention, the spring 3 has a shape obtained by removing the upper portion of a cone, such that is possible to secure a big spring force to the number of winding. That is, it is possible to secure a big force for biasing the lens holder 4. Thus, the spring 3 make the lens holder 4 smoothly move in the optical-axis direction, it is possible to secure high performance.

Also, according to the present embodiment, a cutout 4b through which the spring 3 is engaged with the lens holder 4 is provided. Since part of the spring 3 is accommodated in the cutout 4b, it is possible to reduce the lengths of the spring 3 and the lens holder 4 and to thus miniaturize the entire focusing device.

Also, according to the present embodiment, the lens holder 4 is allowed to move in the optical-axis direction and regulating means for stopping the rotation of the lens holder 4, that is, the assembly of the first protrusion 4a11 and the second protrusion 4a21 of the lens holder 4 with the first guide hole 2b1 and the second guide hole 2b2 of the cylindrical portion 2 of the base 1 is provided. Thus, since the lens holder 4 does not rotate and smoothly moves in the optical-axis direction while the rotor including the outer cam 8 rotates by the driving of the hollow motor, it is possible to secure high performance.

Also, according to the present embodiment, the claw-pole hollow motor is included such that the outer cam 8 having the first guide portion and the inclined portions 8*a*12 and 8*a*22 and the lens moving mechanism including the lens holder 4 having the second guide portion, that is, the first cam 4*a*1 and the second cam 4*a*2 can be accommodated in the hollow motor. Accordingly, it is possible to make the entire focusing device compact.

What is claimed is:

1. A focusing device comprising:
    a lens;
    a lens moving mechanism for moving the lens in an optical-axis direction;
    a motor for driving the lens moving mechanisim;
    a lens holder for holding the lens;
    a guide cylinder fitted to the outside of the lens holder and moved by interlocking with the movement of the lens holder; and
    a rotor arranged outside the guide cylinder and rotating by the driving of the motor,
    wherein the lens moving mechanism includes a first guide portion for guiding the lens to move in the optical-axis direction by a first predetermined distance to a minute focusing region,
    wherein second guide portion for guiding the lens to minutely move in the minute focusing region by a second predetermined distance in the optical-axis direction,
    wherein the first guide portion is formed on the inner circumferential surface of the rotor,
    wherein the second guide portion is formed on the outer circumferential surface of the lens holder,
    wherein a guide protrusion engaged with the first guide portion is provided on the outer circumferential surface of the guide cylinder,
    wherein the guide protrusion is guided to the first guide portion in accordance with the rotation of the rotor to move the lens holder by the first predetermined distance in the optical-axis direction together with the guide cylinder, and
    wherein the lens holder minutely moves in the optical-axis direction by the second predetermined distance in accordance with the rotation of the rotor by the guiding of the second guide portion together with the guide cylinder.

2. The focusing device according to claim 1,
    wherein an engaging portion engaged with the second guide portion is formed in the guide cylinder, and
    wherein a spring for biasing the lens holder is provided in the direction where the second guide portion is engaged wit the engaging portion.

3. The focusing device according to claim 2, wherein the entire shape of the spring is set to remove the upper portion of a cone.

4. The focusing device according to claim 3, wherein a cutout engaged with the spring is formed in the lens holder.

5. The focusing device according to claim 1, further comprising regulating means for allowing the lens holder to move in the optical-axis direction and for stopping the rotation of the lens holder.

6. The focusing device according to claim 1, wherein the second predetermined distance is set to be smaller than the first predetermined distance.

7. The focusing device according to claim 1, wherein the motor is a claw-pole hollow motor.

8. A focusing device comprising:
    a lens having two focuses;
    a lens moving mechanism for moving the lens in an optical-axis direction;
    a motor for driving the lens moving mechanism;
    a lens holder for holding the lens;
    a guide cylinder fitted to the outside of the lens holder and moved by interlocking with the movement of the lens holder; and
    a rotor arranged outside the guide cylinder and rotating by the driving of the motor,
    wherein the lens moving mechanism includes a first moving mechanism for moving the lens in the optical-axis direction by a first predetermined distance between the respective minute focusing regions,
    wherein a second moving mechanism for minutely moving the lens in the optical-axis direction by a second predetermined distance between the respective minute focusing regions,
    wherein the first moving mechanism includes a first guide portion for guiding the first moving mechanism to move the lens in the optical-axis direction by the first predetermined distance,
    wherein the second moving mechanism includes a second guide portion for guiding the second moving mechanism to move the lens by the second predetermined distance in an optical direction,
    wherein the first guide portion is formed on the inner circumferential surface of the rotor,
    wherein the second guide portion is formed on the outer circumferential surface of the lens holder,
    wherein a guide protrusion engaged with the first guide portion is provided on the outer circumferential surface of the guide cylinder,
    wherein the guide protrusion is guided to the first guide portion in accordance with the rotation of the rotor to move the lens holder by the first predetermined distance in the optical-axis direction together with the guide cylinder, and
    wherein the lens holder minutely moves in the optical-axis direction by the second predetermined distance in accordance with the rotation of the rotor by the guiding of the second guide portion together with the guide cylinder.

9. The focusing device according to claim 8,
    wherein an engaging portion engaged with the second guide portion is formed in the guide cylinder, and
    wherein a spring for biasing the lens holder is provided in the direction where the second guide portion is engaged with the engaging portion.

10. The focusing device according to claim 9,
    wherein the entire shape of the spring is determined to remove the upper portion of a cone.

11. The focusing device according to claim 10, wherein a cutout engaged with the spring is formed in the lens holder.

12. The focusing device according to claim 8, further comprising regulating means for allowing the lens holder to move in the optical-axis direction and for stopping the rotation of the lens holder.

13. The focusing device according to claim 8, wherein the second predetermined distance is set to be smaller than the first predetermined distance.

14. The focusing device according to claim 8, wherein the motor is a claw-pole hollow motor.

15. A focusing device comprising:
   a lens;
   a lens moving mechanism for moving the lens in an optical-axis direction;
   a hollow motor for driving the lens moving mechanism;
   a lens holder for holding the lens;
   a guide cylinder fitted to the outside of the lens holder, accommodated inside the cylinder member, and moved by interlocking with the movement of the lens holder; and
   a guide protrusion that protrudes from the outer circumferential surface of the guide cylinder,
   wherein the lens moving mechanism includes a rotor included in the hollow motor,
   wherein a guide groove for guiding the lens to move in the optical-axis direction is provided on the inner circumferential surface of the rotor
   wherein the hollow motor is a claw-pole motor,
   wherein the rotor comprises an annular magnet in which the S pole and the N pole are alternately magnetized in the circumferential direction thereof and a cylinder member to which the magnet is fitted,
   wherein the guide groove is formed in the cylinder member,
   wherein the cylinder member is made of a magnetic material,
   wherein, when the guide protrusion is engaged with the guide groove of the cylinder member and the cylinder member included in the rotor rotates by the driving of the hollow motor, the guide protrusion moves along the guide groove to move the lens holder in the optical-axis direction together with the guide cylinder.

* * * * *